United States Patent
Bachelard et al.

(10) Patent No.: US 8,863,744 B2
(45) Date of Patent: Oct. 21, 2014

(54) STOWAGE BOX FOR BREATHING MASK

(75) Inventors: Leopoldine Bachelard, Chatillon (FR); Philippe Gerard, Beynes (FR)

(73) Assignee: Zodiac Aerotechnics, Plaisir (FR)

( * ) Notice: Subject to any disclaimer, the term of this patent is extended or adjusted under 35 U.S.C. 154(b) by 615 days.

(21) Appl. No.: 12/667,935

(22) PCT Filed: Jul. 10, 2007

(86) PCT No.: PCT/IB2007/053438
§ 371 (c)(1),
(2), (4) Date: Jun. 22, 2010

(87) PCT Pub. No.: WO2009/007794
PCT Pub. Date: Jan. 15, 2009

(65) Prior Publication Data
US 2010/0288281 A1 Nov. 18, 2010

(51) Int. Cl.
*A62B 18/10* (2006.01)
*A62B 7/14* (2006.01)
*A62B 18/02* (2006.01)
*A62B 9/02* (2006.01)
*A62B 25/00* (2006.01)
*B64D 10/00* (2006.01)

(52) U.S. Cl.
CPC .............. *A62B 25/005* (2013.01); *B64D 10/00* (2013.01)
USPC ............ 128/206.27; 128/205.24; 128/205.25; 128/207.12

(58) Field of Classification Search
CPC ...... B64D 10/00; A61M 16/06; A61M 16/20; A62B 7/14; A62B 9/02; A62B 18/00; A62B 25/005

USPC ............ 128/201.28, 205.21, 205.24, 205.25, 128/205.27, 207.12; 137/528, 533.21, 137/533.31, 517, 519, 522; 206/438, 464, 206/476, 482; 15/319, 323
See application file for complete search history.

(56) References Cited

U.S. PATENT DOCUMENTS 3,073,301 A * 1/1963 Hay et al. ................ 128/205.24
4,002,167 A * 1/1977 Rambosek ............... 128/206.24
(Continued)

FOREIGN PATENT DOCUMENTS

| EP | 1433502 | 6/2004 |
| WO | WO02100487 | 12/2002 |
| WO | 2011089463 | 7/2011 |

OTHER PUBLICATIONS

International Search Report in International Application No. PCT/IB2007/053438.

(Continued)

*Primary Examiner* — Justine Yu
*Assistant Examiner* — Douglas Sul
(74) *Attorney, Agent, or Firm* — Kilpatrick Townsend & Stockton LLP; Dean W. Russell, Esq.; Kristin M. Crall, Esq.

(57) ABSTRACT

Embodiments of the invention relate to a stowage box for a breathing mask that includes a frame forming a receptacle for the mask, the frame having an open face for inserting and extracting the mask, and a pneumatic assembly to control the feed of a breathing gas under pressure to the breathing mask. The pneumatic assembly is adapted to close the feed of breathing gas when the mask is inserted into the frame and to open the feed of breathing gas when the mask is extracted from the frame.

12 Claims, 4 Drawing Sheets

(56) References Cited

U.S. PATENT DOCUMENTS

| | | | |
|---|---|---|---|
| 4,561,544 A * | 12/1985 | Reeve | 206/540 |
| 4,625,721 A | 12/1986 | Levine et al. | |
| 4,735,002 A * | 4/1988 | Rath | 34/97 |
| 4,915,106 A | 4/1990 | Aulgur et al. | |
| 5,036,846 A | 8/1991 | Aulger et al. | |
| 5,954,052 A * | 9/1999 | McDonald et al. | 128/206.27 |
| 6,026,590 A * | 2/2000 | Picozza et al. | 34/90 |
| 6,470,887 B1 | 10/2002 | Martinez | |
| 6,755,194 B2 * | 6/2004 | Taieb | 128/206.27 |
| 6,923,183 B2 * | 8/2005 | Martinez et al. | 128/206.27 |
| 6,994,086 B1 | 2/2006 | Martinez et al. | |
| 7,047,972 B2 * | 5/2006 | Ging et al. | 128/207.11 |
| 2004/0144384 A1 | 7/2004 | Martinez | |
| 2012/0325216 A1 | 12/2012 | Bruckert | |

OTHER PUBLICATIONS

International Search Report dated Oct. 19, 2010 in Application No. PCT/IB2010/000607.

* cited by examiner

STOWAGE BOX FOR BREATHING MASK

CROSS REFERENCE TO RELATED APPLICATIONS

This application is the U.S. national phase of International Application No. PCT/IB2007/053438 filed on Jul. 10, 2007, the entire contents of which are incorporated herein by reference.

FIELD OF THE INVENTION

The invention relates to the field of stowage box for breathing mask.

BACKGROUND OF THE INVENTION

To ensure the safety of the passengers and crewmembers in case of a depressurization accident or the occurrence of smoke in the aircraft, aviation regulations require on board all airliners a safety oxygen supply circuit able to supply each passenger and crewmember with an oxygen flow rate function of the cabin altitude. Such oxygen is delivered to the crewmember or passenger, also known as end user, through a breathing mask.

After a depressurization accident or upon the occurrence of smoke in the aircraft, the crewmembers must don their protective mask upon their face as quickly as possible. Indeed, the lack of oxygen at high altitude (hypoxia) or the toxic fumes can alter the crewmembers' abilities to proceed with any emergency measures that will ensure the safety of the passengers and the aircraft.

A protective mask is generally stored in a box called a stowage box located next to the crewmember's position. Generally, the stowage box comprises a frame forming a receptacle for the mask, itself having an open face of rectangular shape for inserting and extracting the mask, and at least two doors closing the open face of the frame, at least in part. The mask is extracted through the face that is closed by two doors that retain and/or protect the mask, each opening and closing about a respective hinge, the two hinges of the doors operating about two parallel hinge axes. The box is installed on the right or left of the seat of the pilot, the open face being generally the top side of the box. The stowage box comprises a pneumatic assembly able to close the feed of breathing gas of the breathing mask when the breathing mask is installed in the stowage box. The objective of the pneumatic assembly is to reduce or suppress the consumption of breathing gas when the mask is not in use. Therefore, the pneumatic assembly is connected to one of the doors of the box such that the feed of breathing gas is closed when the doors are closed and is open when the doors are open.

For instance, patent application US 2004/0144384 discloses such a box.

Problem with such a box is the occupied space in small aircraft. The known boxes are well suited for large aircraft, typically able to transport 100 passengers and more, in which the pilot cabin is large enough.

However, in small passenger aircrafts, typically able to transport between 10 and 80 passengers, the pilot cabin is crowded by all the equipments used to control the aircraft. And there is no space available around the seats of the pilots to install a stowage box as known in the prior art.

SUMMARY OF THE INVENTION

It would be advantageous to achieve a stowage box that can be installed inside a cabin of a small passenger aircraft but with the same functionality and safety as the box of the prior art, i.e. to allow the feed of breathable gas only when the mask is in use but always when the mask is in use.

To better address one or more concerns, in a first aspect of the invention, a stowage box for a breathing mask comprises:
  a frame forming a receptacle for the mask, said frame having an open face for inserting and extracting the mask, and
  a pneumatic assembly to control the feed of breathing gas under pressure to the breathing mask.

And the pneumatic assembly is adapted to close the feed of breathing gas when the mask is inserted into the frame and to open the feed of breathing gas when the mask is extracted from the frame.

The box is advantageously controlling the feed of breathable gas through the position of the mask and not though the position of a door as in the prior art. Therefore the space occupied by the box is less than the space occupied by a prior art box as no space is used by the doors.

In particular embodiments:
  the pneumatic assembly comprises a valve moved by the displacement of the mask relative to the stowage box. Therefore, the feed of breathable gas is advantageously directly controlled by the movement of the mask to or from the box.
  the valve is maintained in an open position by the pressure of the breathable gas when the mask is not stowed in the frame. Therefore, the feed of breathing gas is advantageously guaranteed as soon as the breathing mask is out of the box.
  the valve comprises a cylinder sliding in a tube between an open position where the breathing mask is fed with the breathable gas and a close position where the feed of breathing gas is closed, and such that the breathing gas exercises a pressure to maintain the cylinder in the open position, and the breathing mask pushes the cylinder in the close position when the mask is inserted into the frame. The apparatus to control the feed of breathable gas being simple, with only one mobile part, has the advantage to be reliable and cost effective.
  the frame comprises at least one substantially vertical groove adapted to receive a lug formed on the mask, said lug having an elastic movement to engage into said groove and maintain the breathing mask inside the stowage box. Therefore, the box may advantageously be installed on a wall of the cabin, with the open face on a lateral side of the box, enabling its use even in small and crowded cabin. And the mask may advantageously be taken by the user with only one hand.
  the pneumatic assembly further comprises a U-shaped duct in which the breathable gas circulates, the sliding movement of said cylinder being parallel to the base of the U to blank the duct in the close position. The embodiment has the advantage to keep the feed of breathable gas on the same side of the box and therefore to keep a compact volume for the box.

BRIEF DESCRIPTION OF THE DRAWINGS

These and other aspects of the invention will be apparent from and elucidated with reference to the embodiment described hereafter where.

DESCRIPTION OF EMBODIMENTS OF THE INVENTION

Figure 1:
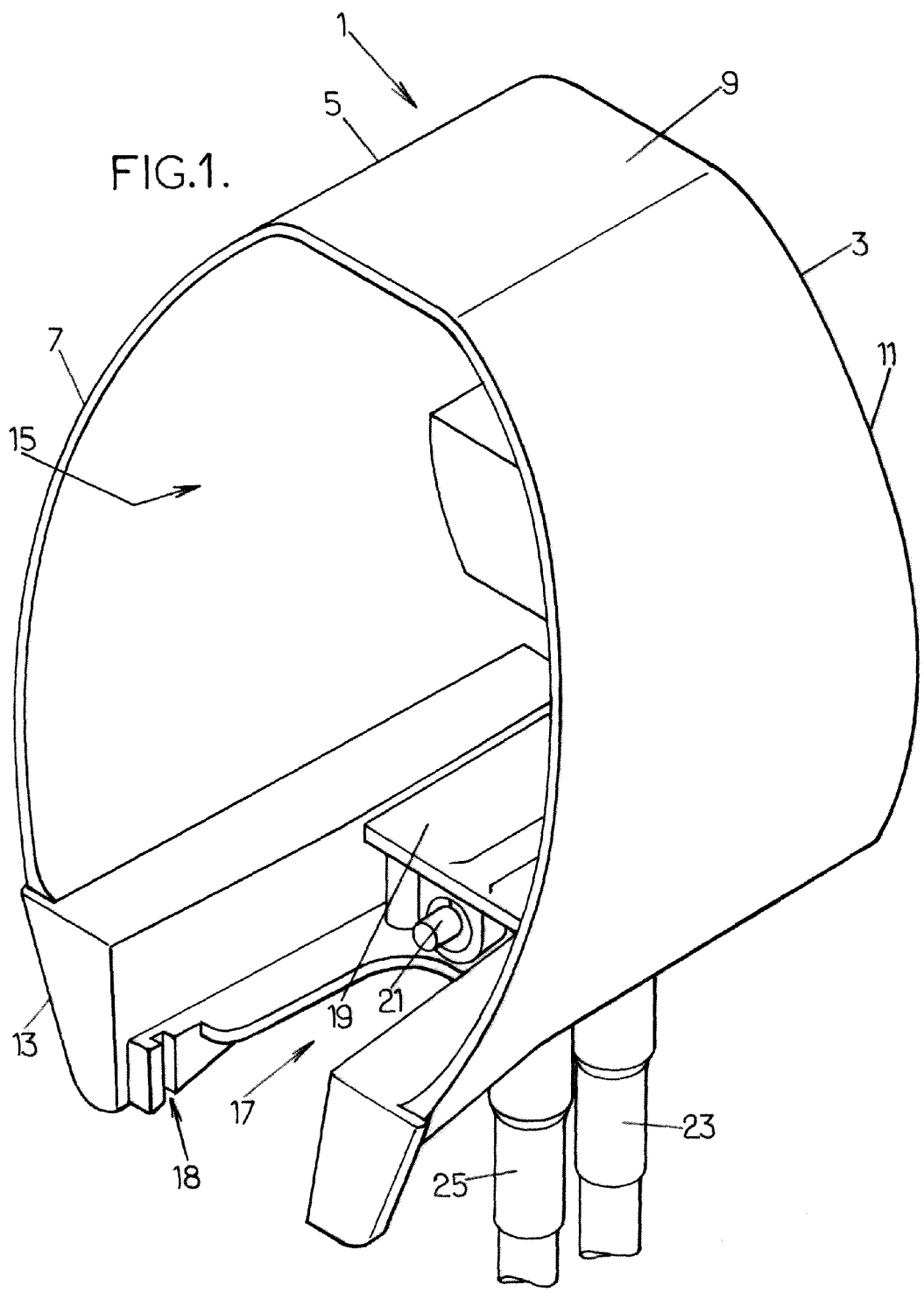
FIG. 1 is an isometric view of a stowage box in accordance with an embodiment of the invention.

In reference to FIG. 1, a stowage box 1 for a breathable mask (not represented) comprises a frame 3 forming a receptacle for the mask. The frame 3 comprises a substantially vertical side 5 which is used to fix the stowage box 1 onto a wall of the aircraft cabin and forms the bottom of the receptacle. The frame 3 further comprises sides 7, 9, 11, 13 forming a volume adapted to enclose the mask and an open face 15 for inserting or extracting the mask.

On the side 13, a mortise 17 leads into the open face. A groove 18 is formed on the side 13, at the entry of the mortise 17. The groove 18 is linear and substantially vertical.

A pneumatic assembly 19 is fixed at an end of the mortise 17 opposite to the open face 15.

The pneumatic assembly 19 comprises a button 21, a first tube 23 coming from a breathing gas generator (not represented) and a second tube 25 connected to the breathing mask. So the breathing mask is fed in breathable gas from the breathing gas generator through the pneumatic assembly 19.

Figure 2:
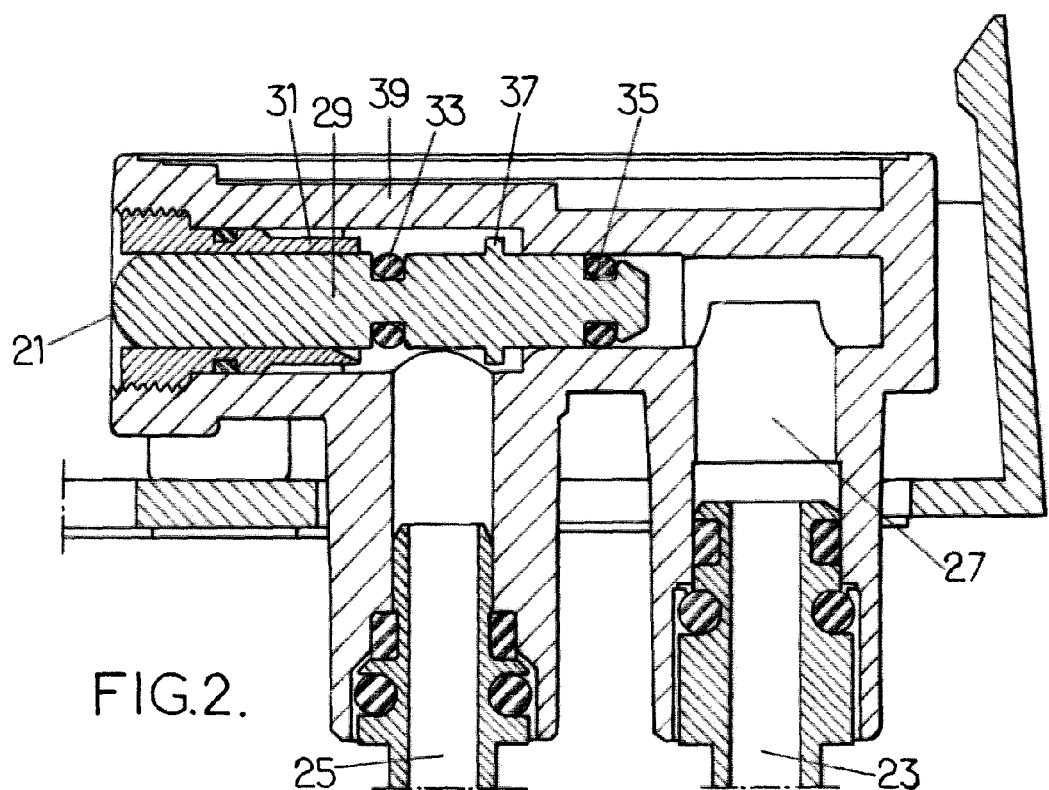
FIG. 2 is a section view of an pneumatic assembly of the stowage box according to FIG. 1.

The pneumatic assembly 19 further comprises, FIG. 2, a duct 27 in U-shape connecting the first tube 23 with the second tube 25.

The button 21 is the proximal end of a sliding valve 29 having a substantially cylindrical form. The valve 29 slides into a tube 31 running on from the base of the U of the duct 27. The valve 29 comprises two O-rings 33, 35, one roughly in the middle of the valve 29 and one at the distal end of the valve 29, opposite of the button 21. The sliding valve 29 comprises also a collar 37.

The tube 31 is screwed into a larger cylinder 39 leading into the duct 27.

Figure 3:
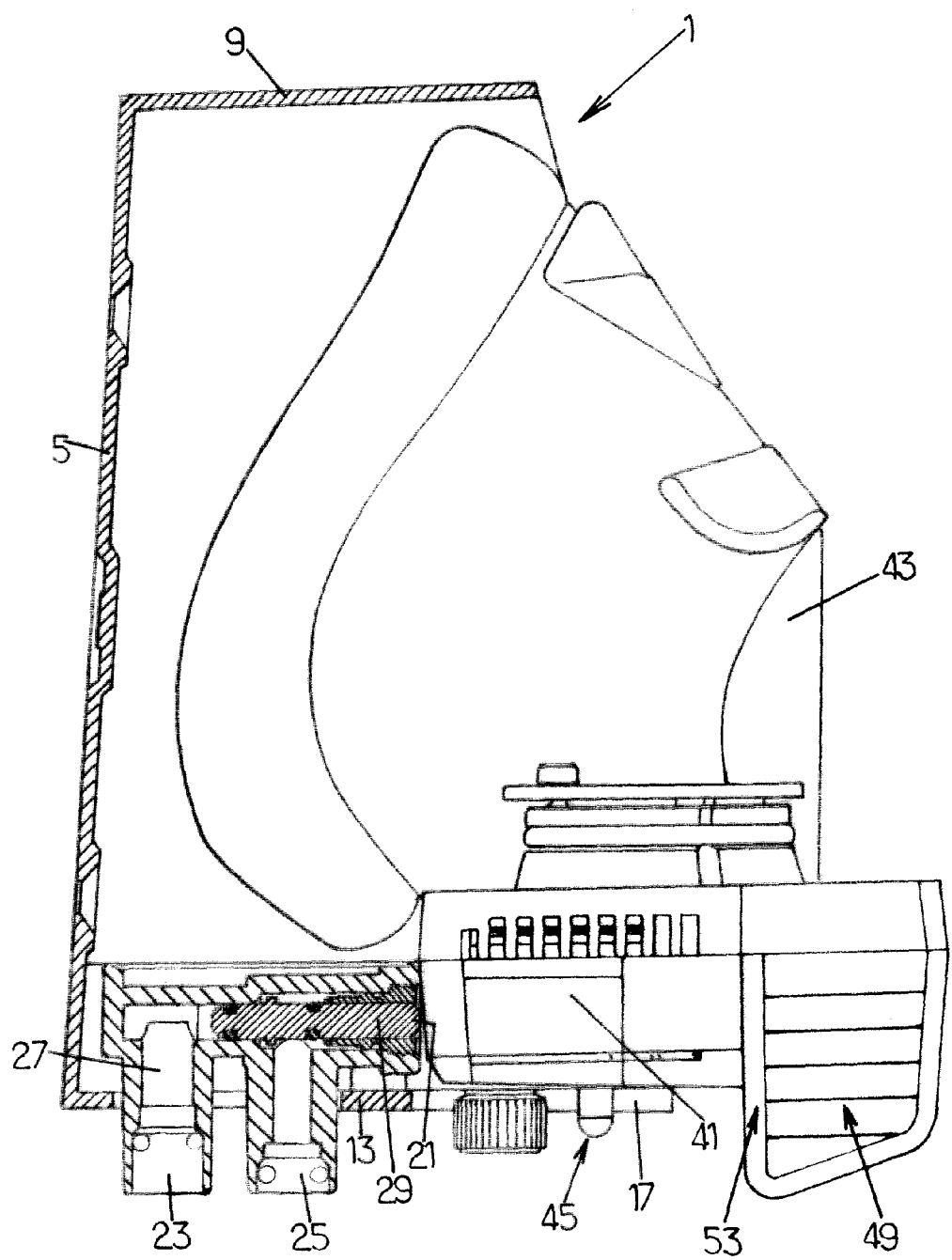
FIG. 3 is a section view of the stowage box according to FIG. 1 with a breathing mask stowed in it.
Figure 4:
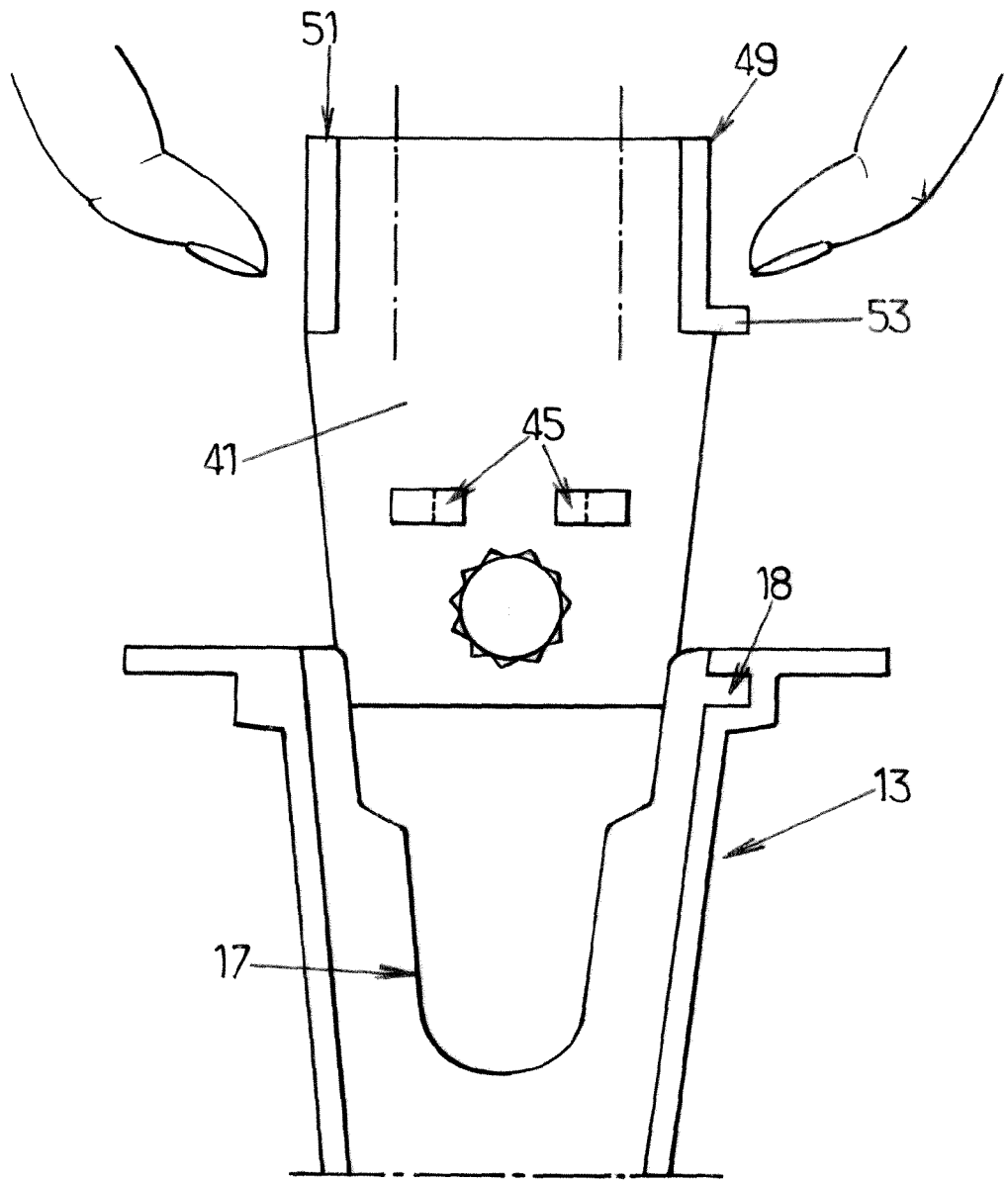
FIG. 4 is a bottom view of a part of the stowage box according to FIG. 1, and of a breathing mask in position to be inserted into the stowage box.

The side 13 and the mortise 17 are adapted, FIG. 3, to guide a rigid part 41 of the breathing mask 43, with the help of two stand-outs 45 of L-shape turned outwardly, so that the breathing mask 43 is positioned in the frame 3.

As shown in FIG. 3, the breathing mask 43 has a face mask portion and a rigid part 41 directly fixed to the face mask portion. In the embodiment shown, the rigid part 41 of the mask comprises a movable part 49, and a fixed part 51 having a striated surface. The moving part 49 comprises a lug 53, adapted to be inserted into the groove 18.

The operation of the stowage box 1 is the following.

The pilot maintains the breathing mask 43 by means of the two parts 49, 51 that the pilot pinches with the thumb and at least the forefinger. The movable part 49 is in an inwards position. When the breathing mask 43 is inserted into the stowage box 1, the rigid part 41 slides along the side 13 and the mortise 17 guides the stand-outs 45 so that the breathing mask 43 is in position inside the stowage box 1. The stand-outs 45 having a L-shape, the border of the mortise 17 is inserted between the bottom of the rigid part 41 and the feet of the stand-outs 45. When the breathing mask is in stowage position, the pilot releases the movable part 49 so that the lug 53 is inserted into the groove 18 so that the breathing mask 43 is maintained in the stowage position by the stand-outs 45 and the lug 53.

In stowage position, the rigid part 41 pushes the button 21 and, therefore, the valve 29 in a close position where the duct 27 is hermetically obstructed by the end of the valve and the O-ring 35.

Figure 5:
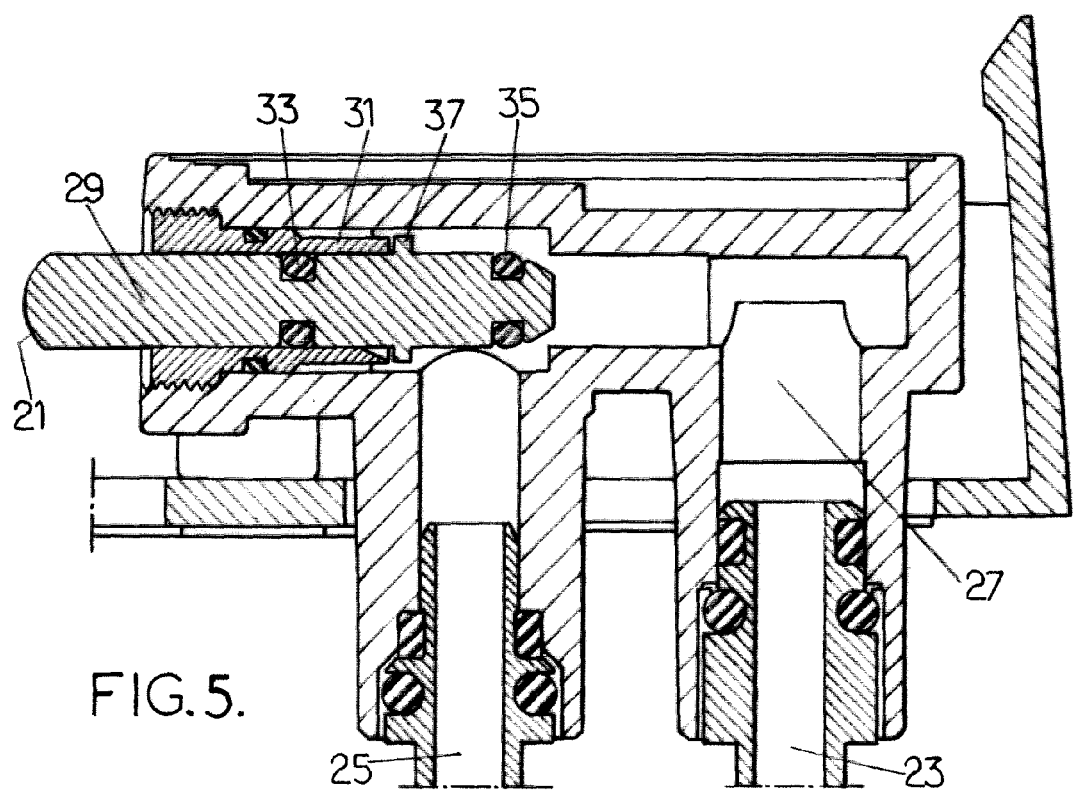
FIG. 5 is a section view of the pneumatic assembly of FIG. 2 when no breathing mask is stowed in the stowage box.

When the pilot needs the breathing mask 43, he pinches the movable part 49 as explained here above to move it inwards and disengage the lug 53 from the groove 18. Then, the pilot can extract the breathing mask 43 from the stowage box, releasing at the same time the valve 29. The breathing gas arrives into the duct 27 through the tube 23 at a pressure of at least 3 bars. Therefore the difference of pressure between the breathable gas and the cabin pressure is such that the valve 29 is pushed by the breathable gas and slides to an open position, FIG. 5. The O-ring 33 hermetically seals the connection between the valve 29 and the tube 31 to avoid any leakage of breathable gas.

The collar 37 limits the movement of the valve 29 by butting against the tube 31 in the open position, and by butting against a shoulder of the duct in the close position.

While the invention has been illustrated and described in details in the drawings and foregoing description, such illustration and description are to be considered illustrative or exemplary and not restrictive; the invention is not limited to the disclosed embodiment.

For instance, different means may be used to maintain the breathing mask in stowage position such as a strap crossing the open face and fixed by a hook and loop fastener.

The groove 18 and its counterpart 53 are described on the right-hand side of the box. However, they may be positioned on the left-hand side or doubled on each side of the mask/box.

In another embodiment, the duct may have an L-shape with the tube 23 running on from the valve 29.

Though the description of the embodiment is done for a stowage box having an open face on a vertical side, the man skilled in the art understands that the described stowage box may be positioned differently, for instance with the open face on the top side of the stowage box.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. A breathing assembly, comprising:
    a breathing mask comprising a face mask portion and a rigid part directly fixed to the the face mask portion,
    a stowage box frame forming a receptacle for the breathing mask, said stowage box frame having an open face for inserting and extracting the breathing mask, said stowage box frame further having guiding elements that cooperate with the rigid part to guide the breathing mask along a sliding axis between a proximal position and a stowage position, and
    a pneumatic assembly comprising a valve movable between an opened position in which the valve enables the feed of the breathing mask with breathing gas and a closed position in which the valve prevents the feed of the breathing mask with breathing gas, wherein movement of the breathing mask along the sliding axis from the proximal position to the stowage position closes the movable valve from the opened position to the closed position and wherein the movable valve is maintained in the closed position as long as the breathing mask is in the stowage position, and the valve is opened when the breathing mask is slided along the sliding axis from the stowage position to the proximal position.

2. The breathing assembly according to claim 1 wherein:
the pneumatic assembly is supported by the stowage box frame, and
in the stowage position the rigid part of the breathing mask pushes the valve in the closed position.

3. The breathing assembly according to claim 2, wherein the valve is urged toward the opened position by the pressure of the breathable gas.

4. The breathing assembly according to claim 3, wherein
the breathing mask further comprises an abutment lug movable with respect to the rigid part between a protruding position and a retracted position,
the stowage box frame comprises at least one substantially vertical groove adapted to receive the abutment lug, said abutment lug being biased into the protruding position, and
when the breathing mask is in the stowage position, said abutment lug being engaged into said groove in the protruding position and disengaged from said groove in the retracted position.

5. The breathing assembly according to claim 3, wherein the valve comprises a cylinder sliding in a tube between the opened position and the closed position, the pneumatic assembly further comprises a U-shaped duct in which the breathable gas is intended to circulate to feed the breathing mask, the sliding movement of said cylinder being parallel to the base of the U and the cylinder obstructing the base of U-shaped duct in the closed position.

6. The breathing assembly according to claim 2 wherein:
the valve is urged in the opened position,
the rigid part of the breathing mask is prevented from sliding from the stowage position to the proximal position by abutment against the stowage box frame.

7. The breathing assembly according to claim 6 wherein the valve moves from the opened position to the closed position by sliding along the sliding axis.

8. The breathing assembly of claim 1, wherein the rigid part comprises two parts configured to be pinched between a user's fingers.

9. The breathing assembly of claim 8, wherein pinching of the two parts causes one of the parts to be moved inward with respect to the other part and to create a securement connection for the breathable mask in the stowage box frame.

10. A breathing assembly comprising:
a face mask portion and a breathing mask comprising a rigid part directly fixed to the face mask portion,
a stowage box frame forming a receptacle for the breathing mask, said stowage box frame having an open face for inserting and extracting the breathing mask, said stowage box frame further having guiding elements that cooperate with the rigid part to guide the breathing mask along a sliding direction between a proximal position and a stowage position, and a securement system to maintain the breathing mask in the stowage box frame and
a pneumatic assembly comprising a valve movable between an opened position in which the valve enables the feed of the breathing mask with breathing gas and a closed position in which the valve prevents the feed of the breathing mask with breathing gas, the valve being urged in the opened position,
wherein in the stowage position, the valve is in the closed position due to the positioning of the breathing mask against the securement system, and the rigid part of the breathing mask is releasably prevented from sliding from the stowage position to the proximal position by abutment against the stowage box frame.

11. The breathing assembly according to claim 10 wherein the valve moves from the opened position to the closed position by sliding along the sliding direction.

12. A breathing assembly comprising:
a face mask portion and a breathing mask comprising a rigid part fixed to the face mask portion,
a stowage box frame forming a receptacle for the breathing mask, said stowage box frame having (i) an open face for inserting and extracting the breathing mask and (ii) guiding elements that cooperate with the rigid part to guide the breathing mask along a sliding direction between a release position and a stowage position, and
a pneumatic assembly comprising a sliding valve that is movable along the sliding direction between an opened position in which the valve enables the feed of the breathing mask with breathing gas, and a closed position in which the valve prevents the feed of the breathing mask with breathing gas, wherein the valve remains urged in the opened position,
wherein movement of the breathing mask along the sliding direction to the stowage position causes the rigid part of the breathing mask to push the valve along the sliding direction to move the sliding valve to the closed position, and wherein movement of the breathing mask along the sliding direction to the release position causes release of the sliding valve along the sliding direction such that the sliding valve moves to its urged opened position.

* * * * *

UNITED STATES PATENT AND TRADEMARK OFFICE
CERTIFICATE OF CORRECTION

PATENT NO. : 8,863,744 B2  
APPLICATION NO. : 12/667935  
DATED : October 21, 2014  
INVENTOR(S) : Leopoldine Bachelardet et al.

Page 1 of 1

It is certified that error appears in the above-identified patent and that said Letters Patent is hereby corrected as shown below:

In the Claims

In column 5, line 48, in claim 10, before "a breathing mask comprising" delete "a face mask portion and"

In column 5, line 48, in claim 10, after "a breathing mask comprising" insert --a face mask portion and--

In column 6, line 26, in claim 12, before "a breathing mask comprising" delete "a face mask portion and"

In column 6, line 26, in claim 12, after "a breathing mask comprising" insert --a face mask portion and--

In column 6, line 27, in claim 12, after "rigid part" insert --directly--

Signed and Sealed this  
Thirty-first Day of March, 2015

Michelle K. Lee  
*Director of the United States Patent and Trademark Office*